(12) United States Patent
Durham

(10) Patent No.: US 11,118,373 B2
(45) Date of Patent: Sep. 14, 2021

(54) STRAINER POST CONNECTOR

(71) Applicant: HAMPTON STEEL LIMITED, Northamptonshire (GB)

(72) Inventor: Christopher John Walter Durham, London (GB)

(73) Assignee: Hampton Steel Limited, Northamptonshire (GB)

( * ) Notice: Subject to any disclaimer, the term of this patent is extended or adjusted under 35 U.S.C. 154(b) by 601 days.

(21) Appl. No.: 16/067,232

(22) PCT Filed: Apr. 10, 2017

(86) PCT No.: PCT/GB2017/050999
§ 371 (c)(1),
(2) Date: Jun. 29, 2018

(87) PCT Pub. No.: WO2017/203202
PCT Pub. Date: Nov. 30, 2017

(65) Prior Publication Data
US 2019/0040650 A1 Feb. 7, 2019

(30) Foreign Application Priority Data
May 24, 2016 (GB) .................................. 1609076

(51) Int. Cl.
*E04H 17/14* (2006.01)
*E04H 17/06* (2006.01)
(Continued)

(52) U.S. Cl.
CPC ......... *E04H 17/1417* (2013.01); *E04H 17/06* (2013.01); *E04H 17/08* (2013.01);
(Continued)

(58) Field of Classification Search
CPC ..... E04H 17/06; E04H 17/08; E04H 17/1413; E04H 17/1447; E04H 17/1448;
(Continued)

(56) References Cited

U.S. PATENT DOCUMENTS 2,221,477 A * 11/1940 Gustafson ............... E04H 17/10
256/47
2,874,430 A * 2/1959 Coldren .................. F16L 33/03
24/27
(Continued)

FOREIGN PATENT DOCUMENTS

FR 2190135 A6 1/1974
FR 2190193 1/1974
(Continued)

OTHER PUBLICATIONS

PCT/GB2017/050999—International Preliminary Report on Patentability dated Dec. 6, 2018, 7 pages.
(Continued)

*Primary Examiner* — Jonathan P Masinick
(74) *Attorney, Agent, or Firm* — Haynes Beffel & Wolfeld LLP; Andrew L. Dunlap

(57) ABSTRACT

Techniques are provided for a metal connector for connecting a strut to a fencing strainer post. The connector includes a first portion and a second portion. The first portion being elastically deformable and arranged to fit around a strainer post. The second portion arranged, when the first portion is deformed, to be inserted into a cavity in a strut and arranged to engage the strut by an at least partial reversal of the deformation.

17 Claims, 4 Drawing Sheets

(51) Int. Cl.
  *E04H 17/18* (2006.01)
  *E04H 17/24* (2006.01)
  *E04H 17/08* (2006.01)
  *F16B 2/24* (2006.01)

(52) U.S. Cl.
  CPC ......... *E04H 17/1447* (2021.01); *E04H 17/18* (2013.01); *E04H 17/24* (2013.01); *E04H 17/1452* (2021.01); *E04H 17/1473* (2021.01); *F16B 2/248* (2013.01)

(58) Field of Classification Search
  CPC . E04H 17/1473; E04H 17/1488; E04H 12/20; F16B 2/20; F16B 2/205; F16B 2/24; F16B 2/243; F16B 2/248; E04F 2011/1819; E04F 2011/1821
  See application file for complete search history.

(56) References Cited

U.S. PATENT DOCUMENTS

| | | | | |
|---|---|---|---|---|
| 2,968,470 | A * | 1/1961 | Pellerito | E04H 17/161 256/47 |
| 2,996,285 | A * | 8/1961 | Johnson | E04H 17/10 256/47 |
| 2,997,278 | A * | 8/1961 | Pinson | F16B 7/0433 256/47 |
| 3,543,353 | A * | 12/1970 | Meehan | B65D 63/10 24/16 PB |
| 3,809,371 | A * | 5/1974 | Martini | E04H 17/10 256/47 |
| 3,951,367 | A * | 4/1976 | Hagelberg | F16L 3/04 248/71 |
| 4,062,523 | A | 12/1977 | Nowatzki et al. | |
| 4,107,824 | A * | 8/1978 | Lussier | F16B 2/248 24/27 |
| 4,260,122 | A * | 4/1981 | Fiala | F16L 3/127 248/71 |
| 4,444,372 | A * | 4/1984 | Klingstedt | E04B 9/18 248/317 |
| 5,743,061 | A * | 4/1998 | Rolph | F16B 13/0891 248/231.91 |
| 5,857,819 | A * | 1/1999 | Lary | F16B 21/125 24/625 |
| 5,961,242 | A * | 10/1999 | Leone | E04H 17/1417 403/234 |
| 6,276,644 | B1 * | 8/2001 | Jennings | F16L 3/04 248/49 |
| 6,513,767 | B1 * | 2/2003 | Rodgers | F16L 3/1025 24/16 PB |
| 6,612,532 | B1 * | 9/2003 | Paulus | B42F 1/04 24/303 |
| 6,779,782 | B1 * | 8/2004 | Webb | E04F 11/1834 256/65.03 |
| 7,669,836 | B2 * | 3/2010 | Trigg | E04H 17/1417 256/65.03 |
| D661,978 | S * | 6/2012 | Holechek | D8/370 |
| 9,341,203 | B1 * | 5/2016 | Disharoon | F16B 2/248 |
| 9,844,842 | B2 * | 12/2017 | Miranda | E04G 5/12 |
| 10,837,577 | B2 * | 11/2020 | Arbuckle | F16L 3/127 |
| 2005/0069398 | A1 * | 3/2005 | Arbuckle | F16B 2/248 411/477 |
| 2005/0224777 | A1 | 10/2005 | Terrels | |
| 2010/0005634 | A1 * | 1/2010 | Kuo | F21V 21/02 24/455 |
| 2014/0060894 | A1 * | 3/2014 | Chen | F16B 2/248 174/252 |
| 2014/0318891 | A1 * | 10/2014 | Crothers | E04F 11/1808 182/113 |
| 2017/0268459 | A1 * | 9/2017 | Alletto | F02F 7/0068 |

FOREIGN PATENT DOCUMENTS

| | | | |
|---|---|---|---|
| FR | 2449768 | 9/1980 | |
| FR | 2554491 | 5/1985 | |
| GB | 2246595 | 2/1992 | |
| JE | 19617012 | 10/1997 | |
| KR | 101477753 | 12/2014 | |
| WO | 8101036 | 4/1981 | |
| WO | WO-2011096828 A1 * | 8/2011 | ............ E04H 17/08 |

OTHER PUBLICATIONS

GB Search and Examination Report (part 1) from GB1609076.3 dated Sep. 15, 2016, 6 pages.
GB Search Report (part 2) from GB1609076.3 dated Mar. 23, 2017, 3 pages.
GB Search Report (part 3) from GB1609076.3 dated Mar. 23, 2017, 3 pages.

* cited by examiner

STRAINER POST CONNECTOR

FIELD

This invention relates to a strainer post connector. In embodiments, it relates to a metal connector for connecting a strut to a fencing strainer post. In other embodiments, it relates to a strainer system comprising such a metal connector.

BACKGROUND

In a fencing system, strainer posts hold the fencing wire in tension. Strainer posts are used, for example, at the end of a run, at a corner, or at any change of direction. In order that the load of the tensioned wire—and any extra load such as leaning animals, fallen trees, wind or drifted snow—does not pull over, distort or break the strainer posts, strainer systems are used to brace the strainer posts against this load.

A typical strainer system includes: a strainer post (which, as explained above, holds the fencing wire in tension); a strut, which counteracts the load on the strainer post from the tensioned wire (and any extra loads such as those listed above); an anchor or an anchor post, which supports the strut; and a tensioning wire, which holds the strut against the strainer post.

The posts and struts of such strainer systems can be made of wood, or of metal such as stainless or galvanised steel or other metal providing similar strength or resistance to corrosion. Metal systems are generally longer-lasting than systems made of wood. Different approaches to connecting the strut to the strainer post and to the anchor post are taken according to whether the posts and struts are made of wood or of metal.

Where the posts and struts are made of wood, a hole is typically carved into each of the strainer post and the anchor post. A sharpened end of the strut is inserted into each hole. The strainer post, anchor post and strut are held together by a tensioning wire stretched between them. Such an arrangement is time-consuming to erect since it requires the installer to cut and shape the posts and struts.

Where the posts and struts are made of metal, a variety of different approaches have been used to connect the strainer post and strut. The various approaches, however, each have a drawback.

Some connectors are formed of welded parts. One example is a hook welded to a strut, with the hook fitting into a hole in the strainer post. Such welded connectors can be expensive to manufacture (because their manufacture requires welding). Further, in the example of the welded hook connector, the azimuthal angle at which the strut can be connected to the strainer post is limited by the position of the hole in the strainer post. Thus, in order to achieve a desired angle of the strut to the strainer post, the strainer post must be driven into the ground with its hole at an appropriate azimuthal angle. This complicates installation.

Some connectors are formed of several parts which are fitted together by the installer. One example is a collar which fits around the strainer post and is bolted to the strut. Connectors formed of several parts may be time-consuming to install since the various parts need to be fitted together. Further, in the example of the connector in the form of a bolted collar, once installed, the connector is exposed to the elements. It is thus subject to weathering and degradation by the elements over time.

An object of at least certain embodiments is to address one or more of these problems.

SUMMARY

According to a first aspect there is provided a metal connector for connecting a strut to a fencing strainer post, the connector comprising a first portion and a second portion, the first portion being elastically deformable and arranged to fit around a strainer post wherein the first portion is substantially an elliptical or an oval arc in cross-section when not deformed, the second portion arranged, when the first portion is deformed, to be inserted into a cavity in a strut and arranged to engage the strut by an at least partial reversal of the deformation, wherein the first portion is arranged to be deformed to be substantially a circular arc in cross-section when the second portion is positioned to engage a strut.

[Connector]

According to a first teaching of this disclosure, there is provided a metal connector for connecting a strut to a fencing strainer post, the connector comprising a first portion and a second portion, the first portion being arranged to fit around a strainer post, the second portion arranged, when an elastically deformable portion of the connector is deformed, to be inserted into a cavity in a strut and arranged to engage the strut by an at least partial reversal of the deformation.

The metal connector, in comprising a first portion arranged to fit around a strainer post, allows for easy engagement with a strainer post, since the first portion can simply be slid on to the strainer post.

In comprising a second portion arranged, when an elastically deformable portion of the connector is deformed, to be inserted into a cavity in a strut and arranged to engage the strut by an at least partial reversal of the deformation, the metal connector also allows for easy engagement with a strut, since the second portion can simply be squeezed (so that the deformable portion is deformed) to insert it into the cavity in the strut. When the second portion is released, an at least partial reversal of the deformation of the deformable portion will occur, such that the second portion expands, thus securing it to the strut.

Further, since the second portion is arranged to be inserted into a cavity in the strut, once in place within the strut, this second portion has greater protection from the elements than if it were located outside of the strut. In use, therefore, the second portion is at least partially protected by the strut from weathering and can be expected to last longer before failure than if it were located outside of the strut.

[Deformable Portion]

The elastically deformable portion may be the first portion. The elastically deformable portion may be the second portion. The elastically deformable portion may be a third portion of the connector.

[Shape]

The first portion may be substantially an elliptical arc in cross-section. The first portion may be substantially, in cross-section, an arc of an oval.

In this way, the first portion is shaped such that it can be placed around a strainer post with substantially any cross-section, provided that the first portion and the strainer post are of appropriate diameters relative to one another. Further, the first portion shaped such that it can be easily turned in an azimuthal direction about a strainer post. Thus, there is no need to orient the strainer post in a particular direction to allow a strut to be connected to it such that the strut extends in a desired direction. This makes installation of a strainer system comprising the metal connector simpler than in a system where the strainer post must be oriented in a particular direction in order to achieve a desired direction of a strut.

The first portion may be arranged to be, when the second portion is positioned to engage a strut, substantially a circular arc in cross-section. When the deformable portion is the first portion—that is, when the metal connector comprises a first, elastically deformable, portion—the first portion may be arranged to be deformed to be substantially a circular arc in cross-section when the second portion is positioned to engage a strut.

This allows for a secure fit of the first portion, when the second portion is engaged with a strut, around a strainer post that is circular in cross-section.

The second portion may be in the form of two arms extending from the first portion. The connector may be arranged such that the arms are displaceable towards one another by a force pushing the arms towards one another. The arms may be arranged with respect to the first portion such that when the arms are displaced towards one another, the first portion is deformed.

This allows the arms to be inserted into a cavity in a strut by squeezing the arms towards one another. This is a fairly simple action, making insertion of the second portion into the cavity straightforward.

The arms may be arranged to extend substantially parallel to one another when the second portion is inserted into the cavity of a strut. This allows for effective engagement of the arms with a strut having a cavity of a substantially constant inner diameter, since it increases the part of the arms that is in contact with the inside of the cavity (relative to an arrangement in which the arms are not parallel) and thus increases the frictional force between the arms and the strut.

Each arm may have a length greater than a diameter of the first portion. In this way, when the first portion is elastically-deformable, the arms can more effectively be used as levers to deform the first portion than if the arms were shorter in length. The length of the arms also provides for a more secure engagement (relative to an arrangement in which the arms were shorter) of the arms within a cavity of a strut, since the frictional force between the arms and the strut is increased.

Each arm may comprise a substantially rounded end, distal from the first portion. Each arm may comprise a curved section, at an end distal from the first portion. The curved section of each arm may be directed substantially towards the other arm. Each arm may be radiused at an end distal from the first portion.

In each of these arrangements, the curve, rounding or radius means that it is easier to insert the arms into a cavity of a strut than if the arms were pointed at their ends, since the curve, rounding or radius helps the arms to slide into the cavity when pushed. These arrangements also make the connector safer to use than an arrangement in which the arms had sharp (unrounded) ends. Further, when the arms comprise a curved section that is directed substantially towards the other arm, the connector is easier to demount from the strut than if the ends of the arms were directed outwards. This is because in this arrangement the arms do not have outwardly-angled tips that could catch on the inside of the cavity.

The first portion and the second portion of the connector may each substantially lie in the same plane. This arrangement is particularly suitable for a box strut strainer system, in which a strut is connected at about 90° to a strainer post. An example of a box strut strainer system will be described below.

The second portion of the connector may be angled to lie substantially in a plane intersecting a plane in which the first portion substantially lies. This arrangement is particularly suitable for an angled strut strainer system, in which a strut is connected to a strainer post such that the strut is angled downwards, towards the ground. In particular, the first portion can fit around the strainer post so that the first portion lies in a plane substantially perpendicular to the axis of the strainer post, with the second portion engaging a strut that is angled downwards relative to the strainer post. Such a configuration of strainer post, connector, and strut can be achieved without the connector needing to be bent by an installer. An example of an angled strut strainer system will be described below.

[Manufacture]

The metal connector may be of wire. This means that less material is needed than if the connector were cut from a blank, which can make the connector cheaper to manufacture. It also means that less machining is required than if the connector were cut out, which makes the connector simpler to manufacture and can therefore also make it cheaper to manufacture.

The first and second portions of the connector may be integrally-formed. When the elastically-deformable portion of the connector is a third portion of the connector, the first, second and third portions of the connector may be integrally-formed. These arrangements mean that the connector requires fewer steps in its manufacture than in an arrangement in which pieces of the connector are welded together. It can thus be cheaper to manufacture than a welded connector.

[Strainer System]

According to a second teaching of this disclosure, there is provided a fencing strainer system comprising a metal connector according to the first teaching, the fencing strainer system further comprising a strainer post and a strut.

The strainer post may define a through-hole arranged to receive a bolt. The through-hole may be positioned to be adjacent the first portion of the metal connector when the fencing strainer system is assembled. In this way, a bolt in the through-hole can be used to vertically locate the metal connector on the strainer post, and to prevent the metal connector from slipping.

The strainer post may be substantially circular in cross-section. This allows for the strut to be positioned at substantially any azimuthal angle to the strainer post, since the metal connector can be rotated around the strainer post until the second portion extends at a desired azimuthal angle.

The metal connector may be a first metal connector, and the fencing strainer system may further comprise a second metal connector. The strainer post may be a first post and the second metal connector may be for connecting the strut to a second post, the connector comprising a first portion and a second portion, the first portion being arranged to fit around a second post, the second portion arranged, when an elastically deformable portion of the connector is deformed, to be inserted into a cavity in a strut and arranged to engage the strut by an at least partial reversal of the deformation. The second metal connector may be substantially the same as the first metal connector. The second post may be an anchor post. The second post may be a second strainer post.

Optional features of the first teaching are also optional features of the second teaching. Further, optional features of the first metal connector are also optional features of the second metal connector.

[Third Teaching]

According to a third teaching of the disclosure, there is provided a metal connector for connecting a strut to a fencing strainer post, the connector comprising a first portion and a second portion, the first portion being arranged to fit around a strainer post, the second portion arranged to be inserted into a cavity in a strut and arranged to engage the strut via an interference fit between the second portion and the strut.

BRIEF DESCRIPTION OF THE DRAWINGS

Specific embodiments will be described below by way of example only and with reference to the accompanying drawings, in which.

SPECIFIC DESCRIPTION OF CERTAIN EXAMPLE EMBODIMENTS

[Box Strut Strainer System]

Figure 1:
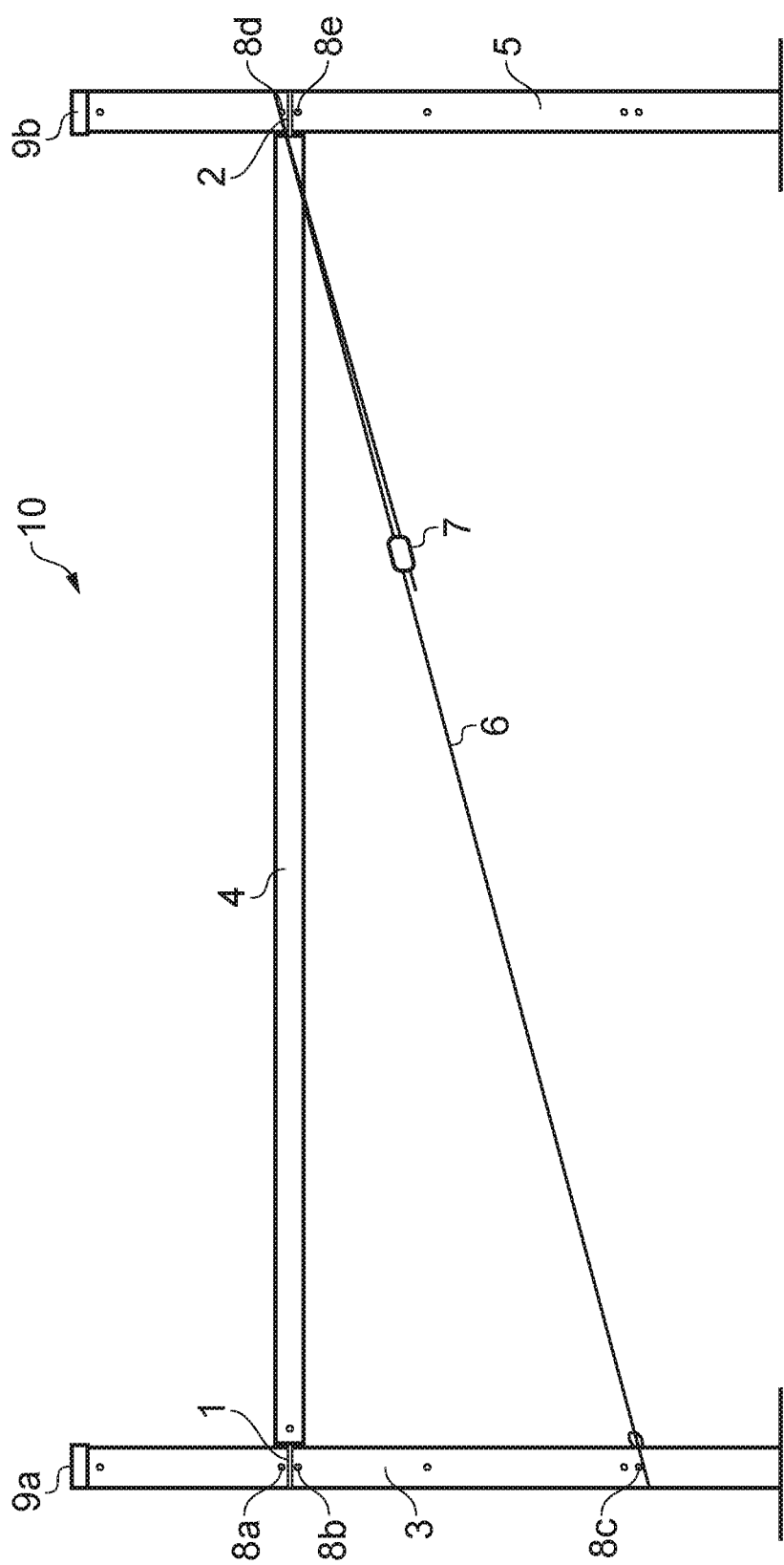
FIG. 1 shows a schematic side view of a "box strut" strainer system comprising a metal connector in accordance with a first embodiment.

FIG. 1 shows a schematic side view of an assembled "box strut" strainer system 10 comprising a metal connector in accordance with a first embodiment. The box strut strainer system 10 is an example of a fencing strainer system. The principal components of the box strut strainer system 10 are a strainer post 3, a strut 4 and a first metal connector in the form of a first wire bracket 1. The first wire bracket 1 connects the strut 4 to the strainer post 3. The strainer post 3 is an example of a first post. The box strut strainer system 10 also has a second post in the form of a second strainer post 5 and a second metal connector in the form of a second wire bracket 2. The second wire bracket 2 connects the strut 4 to the second strainer post 5. A tensioning wire 6, tensioned by a wire tensioning device known as a "gripple" 7, holds the strainer post 3 and the second strainer post 5 together, with the strut 4 between them. Five bolts 8a, 8b, 8c, 8d and 8e prevent the first and second wire brackets 1, 2 from slipping, and also help to keep the tensioning wire 6 in place. The strainer post 3 and the second strainer post 5 are each topped by a post cap 9a, 9b to seal them from the elements. In other embodiments, an alternative wire tensioning device of a sort that would be known to the skilled reader can be used in place of the gripple. In other embodiments, post caps need not be used.

The configuration of each of the above-listed components in the assembled box strut strainer system 10 will now be described, with continued reference to FIG. 1.

In the box strut strainer system 10, the strainer post 3 is upright in the ground. One of the ends of the strut 4 is connected, via the first wire bracket 1, to the strainer post 3 at an angle of about 90°. In this embodiment, the strut 4 is connected to the strainer post 3 near the top of the strainer post 3 (i.e. the end of the strainer post 3 furthest from the ground). The second strainer post 5 is also upright in the ground. The other end of the strut 4 is connected, via the second wire bracket 2, to the second strainer post 5. The other end of the strut 4 is also connected at an angle of about 90°. Thus, the system forms a "box" shape. The tensioning wire 6 is connected between the strainer post 3 and the second strainer post 5, diagonally between a point near where the strut 4 meets the second strainer post 5 and a point near where the strainer post 3 meets the ground.

The strainer post 3 is long enough to hold fencing wire at a desired height. The strainer post 3 is a straight tube in shape. That is, the strainer post 3 is a hollow circular cylinder, open at both ends. In this embodiment, the strainer post 3 is of galvanised steel. In other embodiments, it is envisaged that the strainer post 3 may be of a material providing sufficient strength and resistance to corrosion to be used in a fence. In this embodiment, the second strainer post 5 is substantially the same as the strainer post 3, and so will not be described in further detail here.

Each of the strainer post 3 and second strainer post 5 has a post cap 9a, 9b fitted to its top. The post caps 9a, 9b are substantially the same as one another. In this embodiment, each post cap 9a, 9b is made of plastic. Each post cap 9a, 9b is substantially circular in cross-section and is dimensioned to seal the post on which it is fitted.

In this embodiment, the strut 4 is shorter than the strainer post 3 (although, when the box strut strainer system 10 is assembled, the strut 4 may appear longer than the strainer post 3—for example as shown in FIG. 1—since the strainer post 3 is partially buried in the ground). The outer diameter of the strut 4 is less than that of the strainer post 3. Like the strainer post 3, the strut 4 is a straight tube in shape. That is, the strut 4 is a hollow circular cylinder, open at both ends. In this embodiment, the strut 4 is of galvanised steel. In other embodiments, it is envisaged that the strut 4 may be of another material providing sufficient strength and resistance to corrosion to be used in a fence.

[Flat Metal Connector]

Figure 2A:
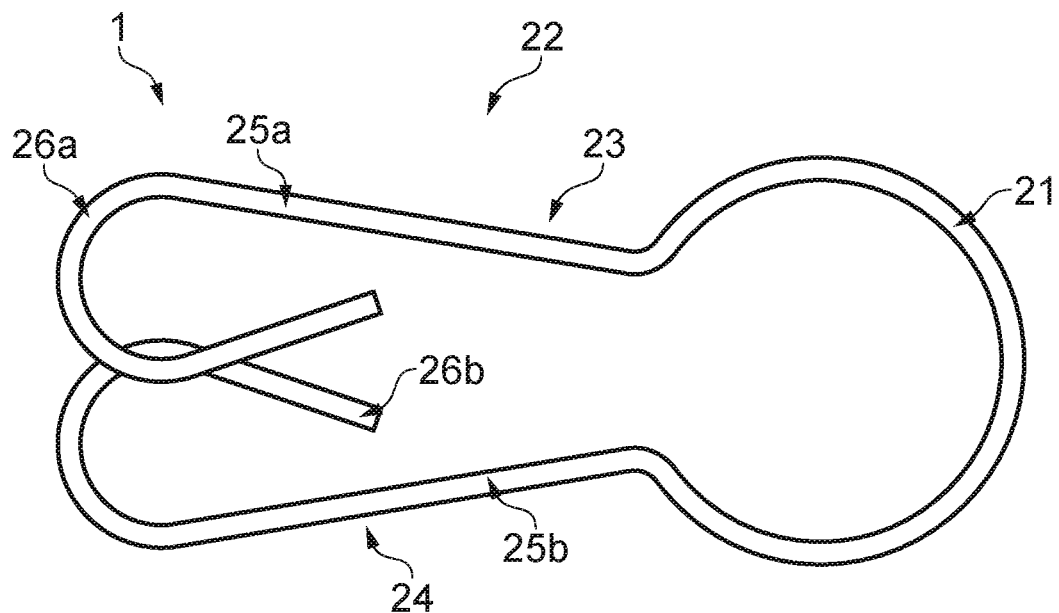
FIG. 2a shows a schematic top view of the metal connector in accordance with the first embodiment.

With reference, now, to FIG. 2a, the first wire bracket 1 will now be described in more detail. FIG. 2a shows a schematic top view of the first wire bracket 1. As implied by its name, the first wire bracket 1 is formed of wire. It is formed of a single piece of wire, bent into a shape that will be described further below. In this embodiment, the wire is 5 mm in diameter. In this embodiment, the wire is of galvanised steel, manufactured to BS EN 4012, galvanised to BS EN 10244-2 class A. In other embodiments, it is envisaged that the wire may be of substantially any diameter and material that provide sufficient strength and resistance to corrosion to be used in a component of a fence, and also that provide sufficient deformability to allow part of the wire bracket to be inserted into a strut (as will be described below).

In outline, the first wire bracket 1 is, broadly, keyhole-shaped. The first wire bracket 1 has a first portion 21 to be fitted around the strainer post 3. The first wire bracket 1 also has a second portion 22. The first portion 21 can be bent (deformed) so that the second portion can be inserted into the hollow strut 4.

The first portion 21 of the first wire bracket 1 is shaped as the arc of an oval. In other words, when viewed from the top, the first portion 21 of the first wire bracket 1 is generally oval in shape, but does not form a complete oval. Instead, the wire traces about ⅘ of the circumference of an oval, including the rounded part of the oval. The first portion 21 is shaped in this way to enable it to be fitted around the strainer post 3.

The second portion 22 of the first wire bracket 1 is in the form of two arms 23, 24 extending from the first portion 21. Each arm 23, 24 has a straight section 25a, 25b adjoining the first portion 21 (and, since the first wire bracket 1 is bent from a single piece of wire, forming a continuation of the shape of the first portion 21). The straight sections 25a, 25b splay outwards from one another. In other words, when the first wire bracket 1 is not in a deformed state, the straight sections 25a, 25b are not parallel to one another but, as they extend away from the first portion 21, extend away from one another.

Figure 2B:
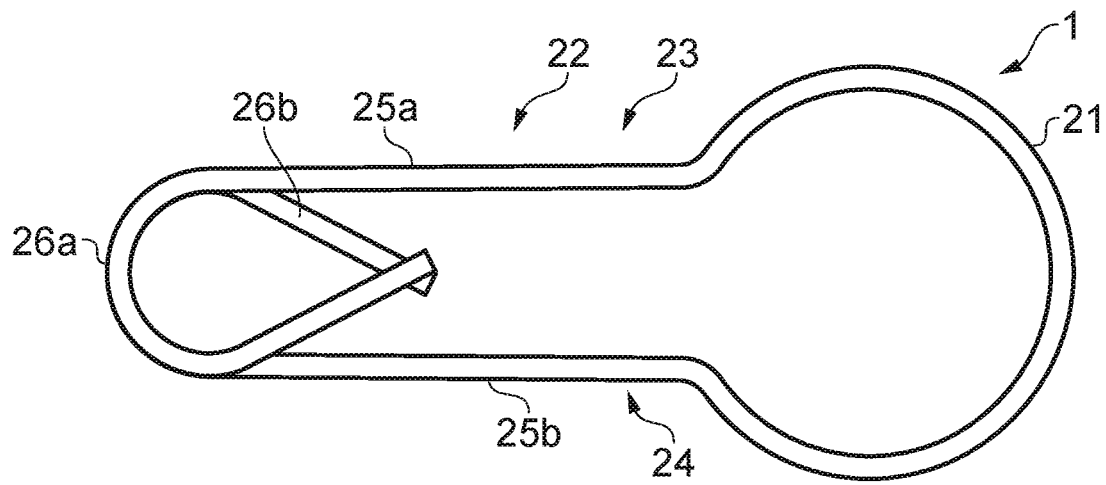
FIG. 2b shows a schematic top view of the metal connector, in a deformed state.

The first portion 21 is elastically deformable. In other words, the first portion is flexible enough that the arms 23, 24 can be inserted into the strut 4. In this embodiment, the arms 23, 24 can be brought together such that the straight sections 25a, 25b are parallel to one another. In this position, the arms 23, 24 can be inserted into the strut 4. In this position, the first portion 21 forms a circular arc (rather than an arc of an oval). This is the position shown in FIG. 2b. In this embodiment, the flexibility is provided by forming the first wire bracket 1 of 5 mm galvanised steel wire. It is envisaged that in other embodiments, it may be the second portion 22 of the connector that is elastically deformable so that it can be inserted into a strut. For example, in one such embodiment, the first portion might be relatively rigid, while the arms were relatively flexible. In still other embodiments, a third portion of the connector may be elastically deformable. For example, in one such embodiment, the arms might each be joined to the first portion by a flexible section, such that the arms could be inserted into a strut without deformation of the first portion or of the arms.

Returning to the description of the present embodiment, at the end of each straight section 25a, 25b furthest away from the first portion 21, the arms 23, 24 each curve back on themselves, as though to form a loop. This forms a curved section 26a, 26b on each arm. The curved sections 26a, 26b of each arm 23, 24 curve inwardly; that is, the curved sections 26a, 26b of each arm 23, 24 curve towards the other arm. The curved sections 26a, 26b thus provide rounded ends to the arms 23, 24 so that they can easily be inserted into the strut 4.

The length of each arm 23, 24—i.e. the distance between the point at which each arm 23, 24 joins the first portion 21 and the point at which each arm 23 turns back towards the first portion 21—is greater than the diameter of the first portion 21. This makes the arms 23, 24 long enough that they can be easily gripped in the hand, and used as levers to deform the first portion 21.

Figure 2C:
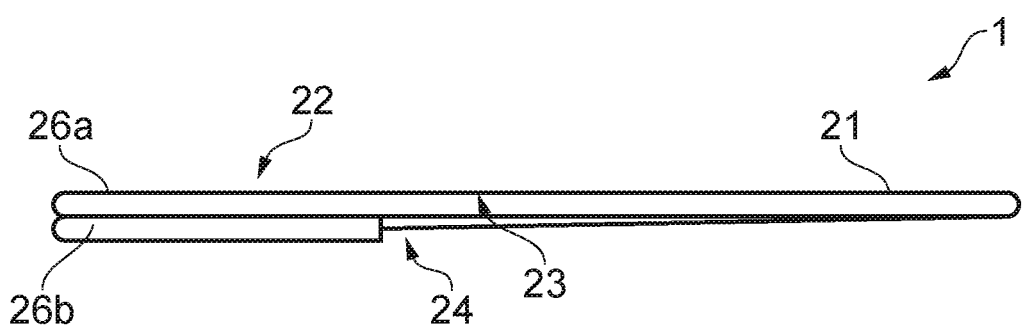
FIG. 2c shows a schematic side view of the metal connector.

FIG. 2c shows a schematic side view of the first wire bracket 1. As can be seen from this Figure, the first portion 21 and the second portion 22 (that is, the arms 23, 24) of the first wire bracket 1 lie substantially in the same plane as one another. In other words, in side view, the first wire bracket 1 is flat.

In this embodiment, since the second strainer post 5 has the same dimensions as the strainer post 3, the second wire bracket 2 is substantially the same as the first wire bracket 1. It will therefore not be described in further detail here.

[Assembly of the Box Strut Strainer System]

With reference, once more, to FIG. 1, and with additional reference to FIG. 2a, assembly of the box strut strainer system 10 will now briefly be described.

The strainer post 3 and second strainer post 5 are positioned apart from one another by the length of the strut 4. The strainer post 3 and second strainer post 5 are then knocked into the ground in these positions.

The arms 23, 24 of the first wire bracket 1 are squeezed together so that the straight sections 25a, 25b are parallel to one another. This deforms the first portion 21 of the first wire bracket 1. The arms 23, 24 (that is, the second portion 22) of the first wire bracket 1 are then inserted into one end of the strut 4 (which, as discussed above, is hollow and is open at both ends). The arms 23, 24 are released. The first portion 21 of the first wire bracket 1 tries to return to its undeformed shape. This causes the arms 23, 24 to spring outwards slightly. They therefore engage the inside of the strut 4, forming an interference fit.

Substantially the same operation is performed with the second wire bracket 2 and the other end of the strut 4. This engages the second portion of the second wire bracket 2 with the other end of the strut 4. The orientation of the second portion of the second wire bracket 2 is adjusted so that the first portions of each of the first and second wire brackets 1, 2 lie in the same plane as one another. This is so that the first portion 21 of the first wire bracket 1 can be fitted over the strainer post 3 while the first portion of the second wire bracket 2 is fitted over the second strainer post 5.

Next, bolts 8b and 8e are fastened through holes (not visible in the Figures) near the top of the strainer post 3 and second strainer post 5 respectively. The first portion 21 of the first wire bracket 1 is placed over the strainer post 3. The first portion of the second wire bracket 2 is placed over the second strainer post 5. Thus, the strut 4 extends between the strainer post 3 and the second strainer post 5.

The first portions of the first and second wire brackets 1, 2 are prevented from slipping down the strainer post 3 and second strainer post 5 (respectively) by the bolts 8b, 8e (or washers on the end of these bolts).

Further bolts 8a, 8d are fastened through holes in the strainer post 3 and second strainer post 5 just above the first and second wire brackets 1, 2. This prevents the first and second wire brackets 1, 2 from lifting upwards. Thus, the strut 4 is secured in place.

One further bolt 8c is fastened through a hole near the bottom of the strainer post 3. The tensioning wire 6, which has a loop at one end, is looped around the strainer post 3 below this bolt 8c, and through itself. The other end of the tensioning wire 6 is wrapped around the second strainer post 5, above the second wire bracket 2, and secured and tightened using the gripple 7.

Finally, the post caps 9a, 9b are pressed on to the top of the strainer post 3 and the second strainer post 5, completing assembly of the box strut strainer system 10.

[Angled Strut Strainer System]

Figure 3:
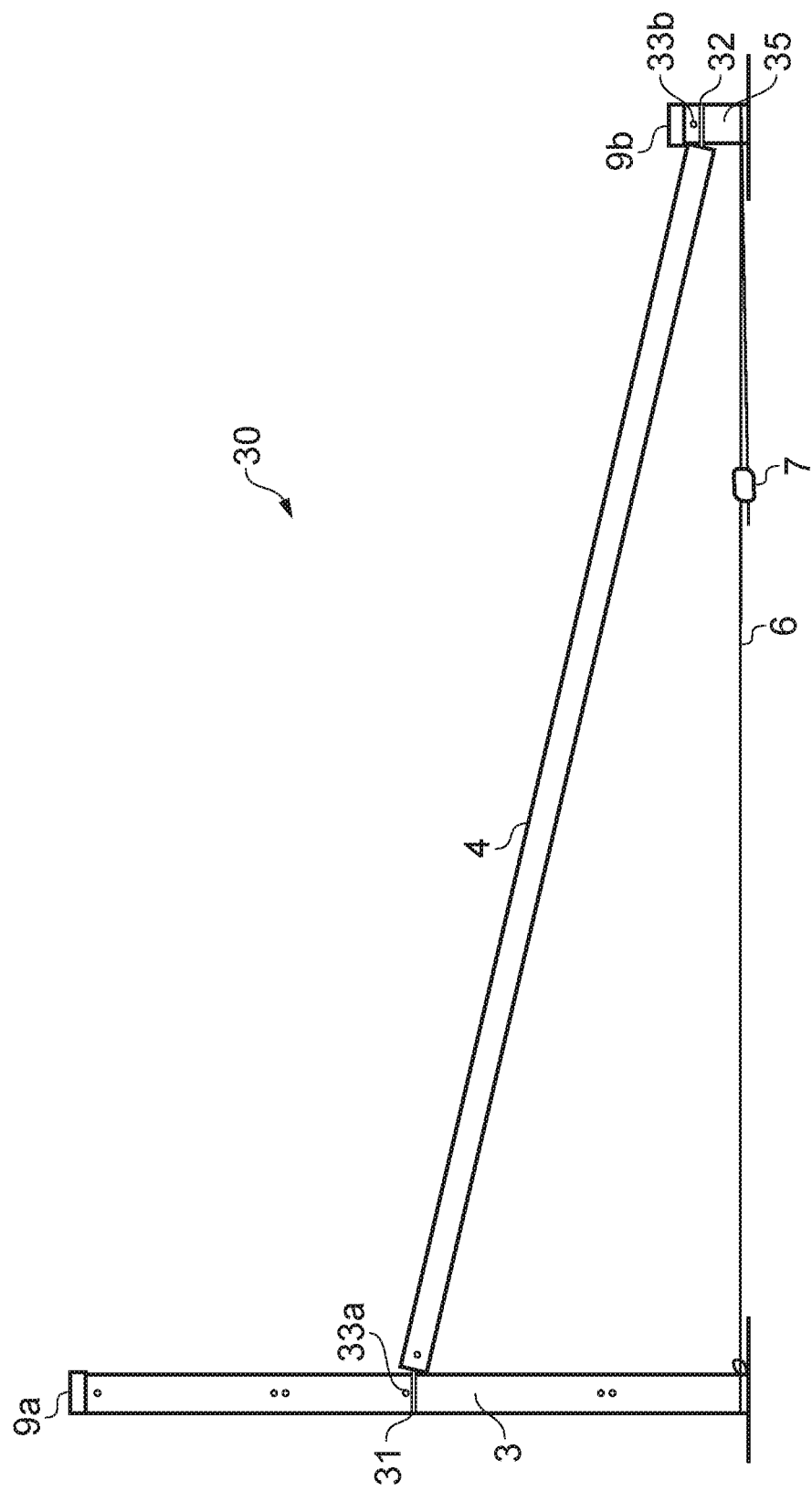
FIG. 3 shows a schematic side view of an "angled strut" strainer system comprising a metal connector in accordance with a second embodiment.

FIG. 3 shows a schematic side view of an assembled "angled strut" strainer system 30 comprising a metal connector in accordance with a second embodiment. The angled strut strainer system 30 is another example of a fencing strainer system. The principal components of the angled strut strainer system 30 are a strainer post 3, a strut 4 and a first metal connector in the form of a first angled wire bracket 31. The first angled wire bracket 31 connects the strut 4 to the strainer post 3. The angled strut strainer system 30 also has an anchor post 35 and a second metal connector in the form of a second angled wire bracket 32. The second angled wire bracket 32 connects the strut 4 to the anchor post 35. A tensioning wire 6, tensioned by a gripple 7 holds the strainer post 3 and the anchor post 35 together, with the strut 4 between them. Two bolts 33a, 33b prevent the first and second angled wire brackets 31, 32 from slipping. The strainer post 3 and the anchor post 35 are each topped by a post cap 9a, 9b to seal them from the elements.

The configuration of each of the above-listed components in the assembled angled strut strainer system 30 will now be described, with continued reference to FIG. 3.

In the angled strut strainer system 30, the strainer post 3 is upright in the ground. One of the ends of the strut 4 is connected, via the first angled wire bracket 31, to the strainer post 3 at a polar angle of about 100°, such that the strut slopes downwards, towards the ground. In this embodiment, the strut 4 is connected to the strainer post 3 near the middle of the strainer post 3 (i.e. around half-way up the strainer post 3). The anchor post 35 is also upright in the ground. The other end of the strut 4 is connected, via the second angled wire bracket 32, to the anchor post 35. The other end of the strut 4 is connected to the anchor post 35 at a polar angle of about 80°. The other end of the strut 4 is connected to the anchor post 35 near the ground. The tensioning wire 6 is connected to both the strainer post 3 and the anchor post 35 near the ground. The tensioning wire 6 is tensioned by the gripple 7 to hold in place the connections between the strainer post 3, strut 4 and anchor post 35.

In this embodiment, the strainer post 3, the strut 4 and the post caps 9a, 9b are each the same as those described above in relation to the box strut strainer system 10. They will therefore not be described further here.

In this embodiment, the anchor post 35 is of a similar construction to the strainer post 3, except that it is shorter. Specifically, it need not be long enough to support a fence at a desired height, since its purpose is to anchor the base of the strut 4. The anchor post 35 is a straight tube in shape. That is, the anchor post 35 is a hollow circular cylinder, open at both ends. The anchor post 35 of this embodiment is of galvanised steel. In other embodiments, it is envisaged that the strut 4 may be of another material providing sufficient strength and resistance to corrosion to be used in a fence.

[Angled Connector]

Figure 4:
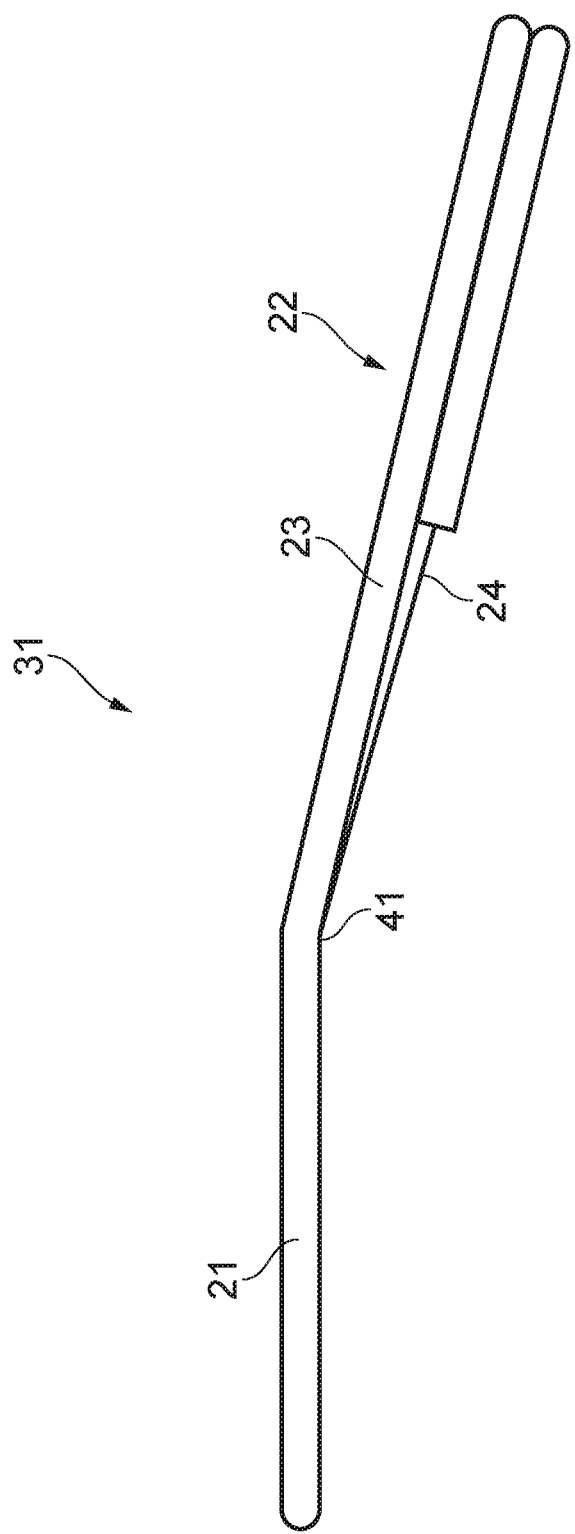
FIG. 4 shows a schematic side view of the metal connector in accordance with the second embodiment.

FIG. 4 shows a side view of the first angled wire bracket 31. The first angled wire bracket 31 is the same as the first wire bracket 1 in all respects except for the plane in which the first 21 and second 22 portions of the first angled wire bracket 31 lie. As discussed above, in the first wire bracket 1, the first 21 and second 22 portions both lie in substantially the same plane (as can be seen in FIG. 2c). In the first angled wire bracket 31, by contrast, the plane in which the second portion 22 lies intersects the plane in which the first portion lies at an angle of about 170°. That is, in side view, the first portion 21 and second portion 22 are at an angle of about 170° to one another. This is achieved by a bend 41 at the point where the arms 23, 24 of the first angled wire bracket 31 meet the first portion 21.

When the first angled wire bracket 31 is used as part of the angled strut strainer system 30, the bend 41 between the first 21 and second 22 portions of the first angled wire bracket 31 allows the strut 4 to be connected to the strainer post 3 at a polar angle of about 100° such that the strut 4 slopes towards the ground. In other embodiments, it is envisaged that the first 21 and second 22 portions of the first angled wire bracket be formed at different angles to one another, such that the angled strainer system 30 can be used with different lengths of strut 4, or different lengths of strainer post 3.

[Assembly of the Angled Strut Strainer System]

With reference, once more, to FIG. 3, and with additional reference to FIG. 4, assembly of the angled strut strainer system 30 will now briefly be described.

The strainer post 3 is knocked into the ground. The first and second angled wire brackets 31, 32 are each inserted into an end of the strut 4 in the manner described above for the first and second wire brackets 1, 2. The only difference in assembly of the angled wire brackets 31, 32 within the angled strut strainer system 30, when compared to the assembly of the first and second wire brackets 1, 2 within the box strut strainer system 10, is that in assembly of the angled strut strainer system 30 the orientation of the second portions (i.e. the arms) of the first and second angled wire brackets within the strut 4 is selected such that the first portion 21 of the first angled wire bracket 31 is angled in one direction, and the first portion of the second angled wire bracket 32 is angled in the opposite direction.

The first angled wire bracket 31 is lowered over the strainer post 3 such that its bend 41 causes the strut 4 to extend downwards, towards the ground. A bolt 33a is fastened through a hole (not visible) in the strainer post 3 just above the first portion 21 of the first angled wire bracket 31. This prevents the first angled wire bracket 31 from slipping up the strainer post 3.

The tensioning wire 6, which has a loop at one end, is looped around the strainer post 3 near the ground, and through itself. The other end of the tensioning wire 6 is threaded through the first portion of the second angled wire bracket 32 and secured and tightened using the gripple 7.

Next, a bolt 33b is fastened through a hole (not visible) near the top of the anchor post 35. The anchor post 35 is sunk into the ground, through the first portion of the second angled wire bracket 32 until the bolt touches the first portion of the second angled wire bracket 32. This secures the end of the strut 4 in place.

Finally, the post caps 9a, 9b are pressed on to the top of the strainer post 3 and the anchor post 35, completing assembly of the angled strut strainer system 30.

There has therefore been described a metal connector for connecting a strut to a fencing strainer post, the connector comprising a first portion and a second portion. The first portion is elastically deformable and arranged to fit around a strainer post. The second portion is arranged, when the first portion is deformed, to be inserted into a cavity in a strut and arranged to engage the strut by an at least partial reversal of the deformation.

There has also been described a fencing strainer system comprising such a metal connector according to any preceding clause, and further comprising a strainer post and a strut.

Clauses

1. A metal connector for connecting a strut to a fencing strainer post, the connector comprising a first portion and a second portion, the first portion being elastically deformable and arranged to fit around a strainer post wherein the first portion is substantially an elliptical or an oval arc in cross-section when not deformed, the second portion arranged, when the first portion is deformed, to be inserted into a cavity in a strut and arranged to engage the strut by an at least partial reversal of the deformation, wherein the first portion is arranged to be deformed to be substantially a circular arc in cross-section when the second portion is positioned to engage a strut.

2. The metal connector of clause 1, wherein the second portion is in the form of two arms extending from the first portion.

3. The metal connector of clause 2, wherein the connector is arranged such that the arms are displaceable towards one another by a force pushing the arms towards one another.
4. The metal connector of clause 2 or clause 3, wherein the arms are arranged with respect to the first portion such that when the arms are displaced towards one another, the first portion is deformed.
5. The metal connector of any of clauses 2, 3 and 4, wherein the arms are arranged to extend substantially parallel to one another when the second portion is inserted into the cavity of a strut.
6. The metal connector of any of clauses 2 to 5, wherein each arm has a length greater than a diameter of the first portion.
7. The metal connector of any of clauses 2 to 6, wherein each arm comprises a curved section, at an end distal from the first portion.
8. The metal connector of clauses 7, wherein the curved section of each arm is directed substantially towards the other arm.
9. The metal connector of any preceding clauses, wherein the first portion and the second portion of the connector each substantially lie in the same plane.
10. The metal connector of any of clauses 1 to 8, wherein the second portion of the connector is angled to lie substantially in a plane intersecting a plane in which the first portion substantially lies.
11. The metal connector of any preceding clauses, wherein the metal connector is of wire.
12. The metal connector of any preceding clauses, wherein the first and second portions of the connector are integrally-formed.
13. A fencing strainer system comprising a metal connector according to any preceding clauses, the fencing strainer system further comprising a strainer post and a strut.
14. The fencing strainer system of clause 13, wherein the strainer post defines a through-hole arranged to receive a bolt, the through-hole be positioned to be adjacent the first portion of the metal connector when the fencing strainer system is assembled.
15. The fencing strainer system of clause 13 or of clause 14, wherein the strainer post is substantially circular in cross-section.
16. The fencing strainer system of any of clause 13 to 15, wherein the metal connector is a first metal connector, and the fencing strainer system further comprises a second metal connector.
17. The fencing strainer system of clause 16, wherein the second metal connector is for connecting the strut to a second post, the second metal connector comprising a first portion and a second portion, the first portion being arranged to fit around a second post, the second portion arranged, when an elastically deformable portion of the second metal connector is deformed, to be inserted into a cavity in a strut and arranged to engage the strut by an at least partial reversal of the deformation.
18. The fencing strainer system of clause 16 or of clause 17, wherein the second metal connector is substantially the same as the first metal connector.
19. The fencing strainer system of clause 17 or 18 wherein the second post is an anchor post, or wherein the second post is a second strainer post.
20. The fencing strainer system of any of clauses 17 to 19, further comprising the second post.
21. A metal connector for connecting a strut to a fencing strainer post, the connector comprising a first portion and a second portion, the first portion being arranged to fit around a strainer post, the second portion arranged to be inserted into a cavity in a strut and arranged to engage the strut via an interference fit between the second portion and the strut.

The invention claimed is:
1. A metal connector for connecting a strut to a fencing strainer post, the connector comprising:
a first portion; and
a second portion,
wherein the first portion is elastically deformable and arranged to fit around a strainer post,
wherein the first portion is substantially an elliptical or an oval arc in cross-section when not deformed,
wherein the second portion is arranged, when the first portion is deformed, to be inserted into a cavity in a strut and arranged to engage the strut by an at least partial reversal of the deformation,
wherein the first portion is arranged to be deformed to be substantially a circular arc in cross-section when the second portion is positioned to engage a strut,
wherein the second portion includes two arms extending from the first portion, and
wherein each arm of the two arms has a length greater than a diameter of the first portion and each arm of the two arms comprises a substantially rounded end that is distal from the first portion.
2. The metal connector of claim 1,
wherein the connector is arranged such that the two arms are displaceable towards one another by a force pushing the two arms towards one another, and
wherein the two arms are arranged with respect to the first portion such that when the two arms are displaced towards one another, the first portion is deformed.
3. The metal connector of claim 1, wherein the two arms are arranged to extend substantially parallel to one another when the second portion is inserted into the cavity of the strut.
4. The metal connector of claim 1, wherein each of the first portion and the second portion of the connector substantially lie in a same plane.
5. The metal connector of claim 1, wherein the metal connector is comprised of wire.
6. The metal connector of claim 1, wherein the first and second portions of the connector are integrally-formed.
7. A fencing strainer system comprising the metal connector according to claim 1, the fencing strainer system further comprising the strainer post and the strut.
8. The fencing strainer system of claim 7,
wherein the strainer post defines a through-hole arranged to receive a bolt, and
wherein the through-hole is positioned adjacent the first portion of the metal connector when the fencing strainer system is assembled.
9. The fencing strainer system of claim 7, wherein the strainer post is substantially circular in cross-section.
10. The fencing strainer system of claim 7,
wherein the metal connector is a first metal connector, and
wherein the fencing strainer system further comprises a second metal connector which is substantially the same as the first metal connector.
11. The fencing strainer system of claim 10,
wherein the second metal connector connects the strut to a second post,
wherein the second metal connector comprises a first portion and a second portion, the first portion being arranged to fit around the second post, and wherein the second portion of the second metal connector is arranged, when an elastically deformable portion of the second metal connector is deformed, to be inserted into a cavity in the strut and arranged to engage the strut by an at least partial reversal of the deformation.

12. The fencing strainer system of claim 11 wherein the second post is one of an anchor post and a second strainer post.

13. The fencing strainer system of claim 11, further comprising the second post.

14. The metal connector of claim 1, wherein the substantially rounded end of each arm of the two arms is directed substantially towards the other arm.

15. The metal connector of claim 1, wherein the second portion of the connector is angled to lie substantially in a plane intersecting a plane in which the first portion substantially lies.

16. A metal connector for connecting a strut to a fencing strainer post, the connector comprising:
a first portion; and
a second portion,
wherein the first portion is arranged to fit around the fencing strainer post,
wherein the second portion is arranged to be inserted into a cavity in the strut and arranged to engage the strut via an interference fit between the second portion and the strut,
wherein the second portion includes two arms extending from the first portion, and
wherein each arm of the two arms has a length greater than a diameter of the first portion and each arm of the two arms comprises a substantially rounded end that is distal from the first portion.

17. A metal connector for connecting a strut to a fencing strainer post, the connector comprising:
a first portion; and
a second portion,
wherein the first portion is elastically deformable and arranged to fit around a cylindrical post having a circular cross-section,
wherein the first portion is substantially an elliptical or an oval arc in cross-section when not deformed,
wherein the second portion is arranged, when the first portion is deformed, to be inserted into a cavity in a strut and arranged to engage the strut by an at least partial reversal of the deformation,
wherein the first portion is arranged to be deformed to be substantially a circular arc in cross-section when the second portion is positioned to engage a strut, such that the circular arc in cross-section of the first portion surrounds and is in contact with at least approximately 75% of the circular cross-section of the cylindrical post,
wherein each of the first portion and the second portion of the connector substantially lie in a same plane,
wherein the second portion includes two arms extending from the first portion, and
wherein each arm of the two arms has a length greater than a diameter of the first portion and each arm of the two arms comprises a substantially rounded end that is distal from the first portion.

\* \* \* \* \*